United States Patent [11] 3,548,102

[72] Inventors Gustav Schaum
Leverkusen;
Rudolf Kremp, Grunwald B. Munchen;
Johann Becker, Dinslaken; Fritz Hieber,
Grunwald B.; Hans-Peter Huber,
Munchen, Germany

[21] Appl. No. 602,914
[22] Filed Dec. 19, 1966
[45] Patented Dec. 15, 1970
[73] Assignee AGFA-Gevaert Aktiengesellschaft
Leverkusen, Germany
[32] Priority Dec. 30, 1965
[33] Germany
[31] No. A51212

[54] TELEPHONIC REMOTE CONTROL ARRANGEMENT
2 Claims, 8 Drawing Figs.

[52] U.S. Cl. .......... 179/2
[51] Int. Cl. .......... H04m 11/00
[50] Field of Search .......... 179/2R, (Cursory), 2, 2DP, 5

[56] References Cited

UNITED STATES PATENTS

| | | | |
|---|---|---|---|
| 3,360,777 | 12/1967 | Kolm | 179/2UX |
| 3,231,670 | 1/1966 | Lane | 179/2(R) |
| 3,280,259 | 10/1966 | Cotter | 179/2(R) |

*Primary Examiner*—Ralph D. Blakeslee
*Attorney*—Michael S. Striker

ABSTRACT: A telephone ringing signal pattern decoder activates of a relay, which energizes a timing circuit to control an electric appliance over telephone lines. The timing circuit reports its status back to the calling telephone.

INVENTOR.

BY GUSTAV SCHAUM
RUDOLF KREMP
JOHANN BECKER
FRITZ HIEBER
HANS-PETER HUBER

INVENTOR.
GUSTAV SCHAUM
RUDOLF KREMP
JOHANN BECKER
FRITZ HIEBER
HANS-PETER HUBER
BY

INVENTOR.
BY GUSTAV SCHAUM
RUDOLF KREMP
JOHANN BECKER
FRITZ HIEBER
HANS-PETER HUBER

INVENTOR.

BY GUSTAV SCHAUM
RUDOLF KREMP
JOHANN BECKER
FRITZ HIEBER
HANS-PETER HUBER

TELEPHONIC REMOTE CONTROL ARRANGEMENT

The present invention relates to an arrangement for the controlling of electrical equipment, particularly heating apparatus, through the application of conventional telephone circuits.

The prior art teaches the use of telephone apparatus for transmitting switching signals, for controlling purposes, to electrical heating equipment and the like. However, such arrangements have, heretofore, presented considerable difficulties to the central stations or distributing agencies where the connections between telephones are established.

Accordingly, it is an object of the present invention to provide an arrangement for controlling electrical equipment through the application of conventional telephone circuits and commonly known telephone apparatus.

It is another object of the present invention to provide an arrangement for controlling electrical equipment, of the character described, whereby the control of the electrical equipment cannot be erroneously exercised by unauthorized calling persons.

Still another object of the present invention is to provide an arrangement for controlling electrical equipment, as described, whereby the controlling function can be exercised only upon transmission of a predetermined signal arrangement, over the telephone lines.

A further object of the present invention is to provide an arrangement for controlling electrical equipment, as set forth, which is of simple design and reliable in its operation.

A yet further object of the present invention is to provide an arrangement, as set forth, which may be easily installed.

A still further object of the present invention is to provide an arrangement for controlling electrical equipment as set forth, which may be manufactured and maintained economically.

With the preceding objects in view, the present invention includes an arrangement whereby the ringing signals normally transmitted along a conventional telephone line, are added through a summing device. When the number of ringing signals thus received, is equal to a predetermined quantity, circuitry is actuated whereby signals are transmitted to the electrical equipment to be controlled. The sensing device which receives and transmits the ringing signals to the summing device, may be located externally to the telephone apparatus. The arrangement according to the present invention does not, therefore, interfere or affect the design and construction of the telephone apparatus used with conventional telephone circuits.

The novel features which are considered as characteristic for the invention, are set forth in particular in the appended claims. The invention itself, however, both as to its additional objects and advantages thereof, will be best understood from the following description of specific embodiments when read in connection with the accompanying drawings, in which:

Figure 1:
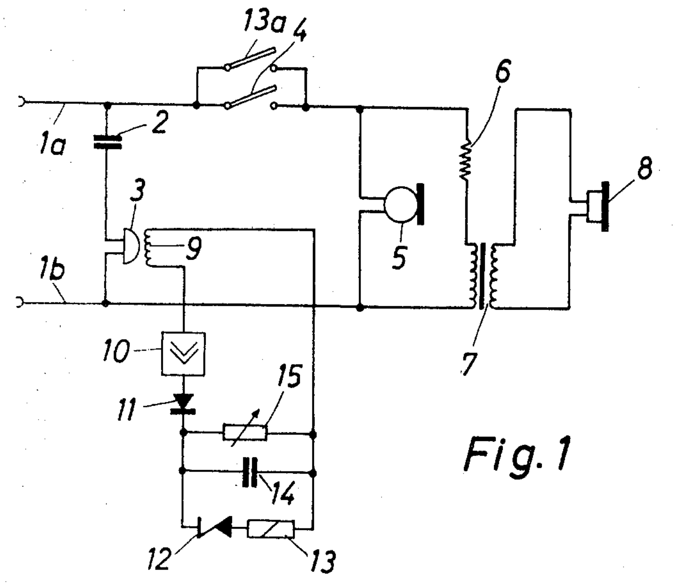
FIG. 1 is an electrical schematic diagram for adding the number of ringing signals that have been transmitted.

Referring to the drawing and, in particular to FIG. 1, the main leads and connections of a telephone apparatus are designated by 1*a* and 1*b*. Arranged within the apparatus, in the conventional manner, are a capacitor 2, a bell 3, a switch 4 actuated by the movement of the receiver hook, a microphone 5, a resistor 6, a transformer 7 and a receiver or earpiece 8. Outside of the apparatus and located as close to the bell 3 as possible, is a coil 9 which receives a portion of the bell current by being inductively coupled therewith. Within the circuit of the coil 9, are connected an amplifier 10, a rectifier 11, a zener diode 12, and a relay 13. A capacitor 14 and a variable resistor 15 are each connected in parallel with the series circuit of the zener diode 12 and relay coil 13. Associated with the relay coil 13 is a switching contact 13*a* connected in parallel with the switch 4. The switching contact 13*a* is actuated by the energizing of the relay coil 13. The relay 13 regulates, in turn, a flip-flop which controls, for example, electric room heating apparatus desired to be operated by way of a telephone.

When a signal is received by the telephone apparatus, a portion of the ringing current appears in the coil 9 and is conducted to the amplifier 10, and, from there to the rectifier 11. Provided that the potential drop across the capacitor 14 is small, the zener diode 12 is substantially nonconducting. The pulsing current derived from the rectifier 11 is, accordingly, stored in the capacitor 14. The variable resistor 15 is set to such a value that only a portion of the current stored in the capacitor 14 can discharge through the resistor, during the interval of two ringing signals. The voltage across the capacitor 14 rises, therefore, in relation to the number of ringing signals that are transmitted. When the voltage, across the capacitor 14, has attained a predetermined value, the zener diode commences to conduct and the relay 13 is actuated. As a result, the switching contact 13*a* and hence the transmission line of the telephone, are both closed. With this closure of the circuit, the ringing signals cease. Aside from this, the person placing the call through the telephone has an indication whether the arrangement, dependent upon the switching state of the relay 13 has been properly operated. Thus, the relay 13 remains energized until the capacitor 14 has discharged to a predetermined value. After the main transmission line of the telephone has become opened, through the release of the relay 13, the capacitor 14 discharges completely through the resistor 15.

The number of ringing signals received by the telephone apparatus before the relay 13 is operated, is essentially determined by the value of the resistor 13, magnitude of the capacitor 14, the amplification characteristics of the amplifier 10, and the properties of the magnetic path linking the coil 9. For purposes of realizing the desired operation of the system, the number of ringing signals required to actuate the relay 13, is designated as considerably larger than that prevailing when a normal conversation type of call is placed. In this manner, the controlling system associated with the telephone apparatus is not actuated in response to the usual type of calls. Once the ringing signals are discontinued, the capacitor 14 discharges relatively rapidly across the resistor 15 and places thereby the system in a state of readiness.

Figure 2:
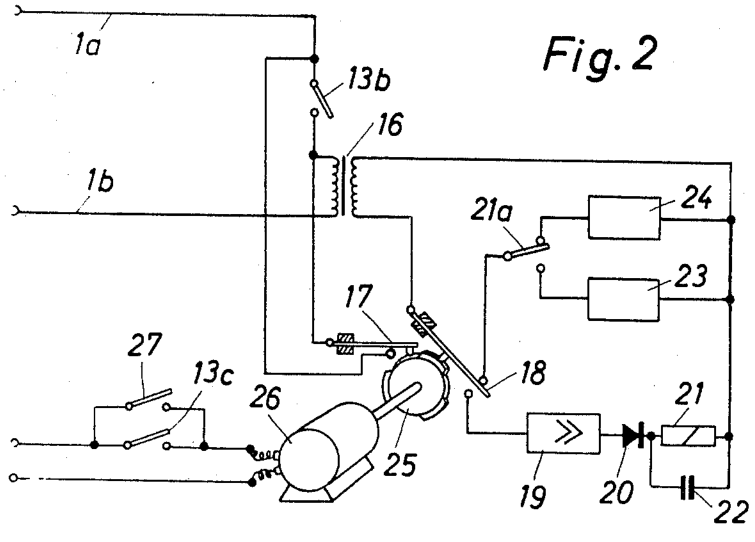
FIG. 2 is a functional schematic diagram of an embodiment which improves upon the arrangement of the FIG. 1.

FIG. 2 shows an acoustical arrangement whereby the calling party, acquainted with the operation of the system, may place a call and furnish instructions to the relay 13. In this arrangement, the relay 13 actuates a switching contact 13*b* which connects the primary winding of a transformer 16 across the main leads 1*a* and 1*b*. A switching arrangement 17, to be described, is connected in parallel with the switching contact 13*b*. The switching contact 13*a* may in this configuration of FIG. 2, be omitted.

The circuit of the secondary winding of the transformer 16 includes a switch 18 having a contact which leads to an amplifier 19 in series with a rectifier 20. A parallel combination of a relay 21 and capacitor 22 actuates the circuit (not shown) which it controls in a manner such that this circuit is switched on upon operation of the relay, and is then switched off when the relay 21 is further operated. The relay may be designed to include additional such switching stages, if desired.

Connected to the other contacts of the switching arrangement 18, is a switching arm 21*a* which is actuated by the operation of relay 21. Both contact associated with the switching arm 21*a* lead to alternating current signal generators 23 and 24 which are connected, in turn, to the secondary winding of the transformer 16. These signal generators serve to apply signals of different frequencies to the transformer 16 and hence to the main communication line *1a*—*1b* of the telephone. By assigning to each of these generators a differently pitched tone signal, as for example a high or low pitch, the person placing the call to the telephone apparatus is able to determine which one of the signal generators is switched into the circuit. Thus, by hearing either the low or high-pitch tone, the calling person is able to differentiate between the two signal generators and is able, therefore, to determine from this operating state of the flip-flop relay 21.

The switch 18 is actuated by the rise of a cam 25 driven by an electric motor 26. The electric circuit whereby the motor 26 is operated, includes a switching contact 13*c*, actuated by the relay coil 13. A further switching contact 27 is connected in parallel with the switching contact 13*c*. The switching contact 27 is actuated by the cam 25, in a manner whereby it is closed at the beginning of the cycle and is reopened again after the cam has turned a complete revolution. The embodiment of FIG. 2 operates in the following manner:

When the relay coil 13 becomes energized, in the manner described supra, the switching contact 13*b* is closed whereby the transformer 16 is connected to the main leads 1*a* and 1*b* of the telephone communication line. With the closure of contact 13*c*, at the same time, the motor 26 commences to drive and causes the closure of switch 27 a brief duration thereafter. The switch 17 connected in parallel with the switching contact 13*b*, inhibits interruption of the main telephone communicating line when the relay 13 is released. The period of time during which the relay 13 remains energized is, in all cases, shorter than the time interval required for the cam 25 to turn a complete revolution. The secondary winding of the transformer 16 includes the flip-flop relay 21 as well as the signal generators 23 and 24, corresponding to high-pitched tones and low-pitched tones, respectively. As already indicated the calling person is able to determine which one of the signal generators is switched into the circuit by observing the pitch of the tone. If he wishes to apply a change, he generates a loud sound over the telephone line, after the switch 18 has changed position as a result of the cam 25, and the transmission of the signals from the generator 23 and 24 has ceased. The sound generated by the calling person is amplified by the amplifier 19, and, after passing through rectifier 20, operates the relay 21. The capacitor 22 serves as a smoothing device and prevents repeated operation of the relay 21 by the pulsing current derived from the rectifier 20. During the next phase of motion of the cam 25, the state of the relay 21 can again be observed and, if desired, its state may again be changed during the subsequent phase of the cam motion. If, on the other hand, the calling person is satisfied with the state of the relay 21, the conversational link is interrupted, and the motor 26 drives until the cam has completed a full revolution whereby the switches 27 and 17 are opened. Any further actuation of the switching arm 18 by the cam 25 has thus no effect upon the operation of the relay 21. When the motor 26 ceases to drive, the system returns to its initial condition as illustrated in FIG. 2.

If desired, it is possible to connect to the circuit, a telephone answering apparatus which is actuated at the instant that the motor 26 begins to drive, and has a magnetically stored communication which relates to the calling person that the party cannot be reached at this time, and that he should hang up the receiver because the telephone link is being used for control purposes. In this manner, the calling person will not be upset as he would be, if he persisted in ringing the telephone and hearing finally little more than a high-pitched tone or a low-pitched tone.

Figure 3:
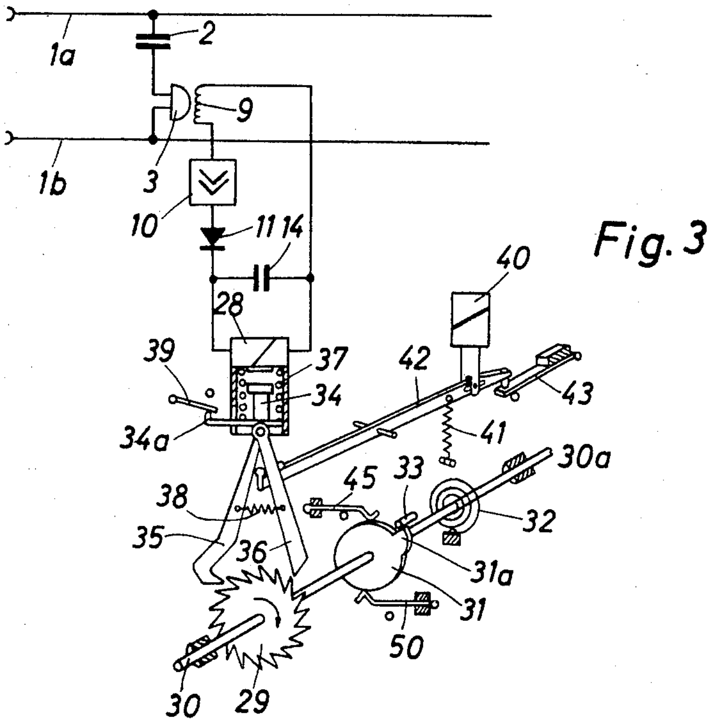
FIG. 3 is a functional schematic diagram of an arrangement whereby mechanical means are utilized to add the number of ringing signals that have been transmitted.

FIG. 3 illustrates another technique for accumulating the ringing signals. In this arrangement, the preceding coil 9, amplifier 10, diode 11, and capacitor 14 are connected to the coil 28 of an electromagnet associated with a stepping type of mechanism. The latter comprises a ratchet form of wheel 29, which is mounted on a shaft 30, held in bearings 30*a* supported by the housing. A cam 31 is also mounted on the shaft 30. The cam has a rise 31*a* which bears against a fixed stop 33 as a result of the action of the torsion spring 32. Associated with the coil or solenoid 23, is an armature 34 to which are secured the links 35 and 36. The links 35 and 36 are coupled together by the spring 38 and serve, alternately as pawls and ratchet stops. When the armature 34 is attracted to the core of the solenoid 28, the link 35 engages the ratchet wheel 29 and rotates, in clockwise direction, the latter through one-half of the pitch movement. When the solenoid 28 becomes deenergized and the armature is returned to its initial or normal position by a return spring 37, the link 36 engages the ratchet wheel 29 and rotates it, in clockwise direction, the second half of the pitch movement.

The armature 34 is provided with an arm 34*a* which engages a switch 39, at the end of the armature stroke. The switch 39 connects to a solenoid 40, which, when energized, moves against the action of a spring 41. When the solenoid 40 is thus actuated, it moves a lever 42 in a manner whereby the links 35 and 36 are spread apart. When the links 35 and 36 are spread, sufficiently, they are disengaged from the ratchet wheel 29, and, accordingly, the action of the torsion spring 32 returns the shaft 30 to its initial or null position. The lever 42 also actuates the switch 43 which is open when the solenoid 40 is in the energized state.

Figure 4:
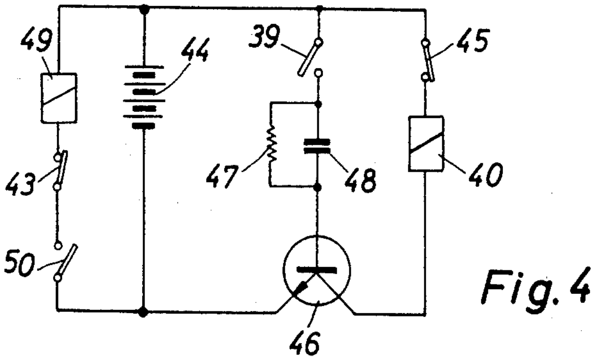
FIG. 4 is an electrical schematic diagram of the circuit associated with the arrangement of FIG. 3.

The electrical circuit for the embodiment of FIG. 3, is illustrated in FIG. 4. The circuit, energized by a battery 44, includes a switch 45 which is opened by the cam 31 just before the latter completes a full revolution. The circuit also includes the solenoid 40 and an NPN transistor 46. The parallel combination of a resistor 47 and capacitor 48 is connected to the base of the transistor 46, on one hand, and to the switch 39, on the other hand. Connected, moreover, in parallel with the battery 44, is the series circuit comprised of a relay 49, the switch 43 and a switch 50 which is actuated by the cam 31. The switch 50 is closed when the cam 31 has rotated a predetermined angle corresponding to a selected number of ringing signals. The embodiment of FIGS. 3 and 4 operates in the following manner:

In the initial or normal state of the arrangement, all parts are in the position or state shown in the drawing. The transmittal of the first ringing signal causes the solenoid 28 to become actuated. Due to the action of spring 41, the links 35 and 36 are, at this point, spread apart to the extent that this particular actuation of the solenoid 28 has no effect upon the ratchet wheel 29. At the same time, the switch 39 becomes closed whereby the capacitor 48 charges and the transistor 46 conducts due to the condition that its base is positive with respect to its emitter. The time constant of the RC network comprised of resistor 47 and capacitor 48 is selected so that it exceeds the period of time that may elapse between two successive ringing signals. With transistor 46 in the conducting state, the solenoid 40 is energized, and as a result the lever 42 becomes actuated. With the lever 42 thus acted upon, the links 35 and 36 are disengaged from the ratchet wheel 29.

When the first ringing signal is terminated, the switch 39 becomes reopened as a result of the release of the armature 34. The capacitor 48 begins to discharge, thereby, through the resistor 47. However, before the transistor 46 ceases to conduct and solenoid 40 is deenergized, a new ringing signal is received. The latter acts upon the solenoid 28 so that the ratchet wheel 29 is rotated through half a pitch motion, when the solenoid 28 is energized, and again when the solenoid is released. Accordingly, the ratchet wheel 29 is rotated through a full pitch motion when the solenoid 28 is both energized and released.

The closing of the switch 39 while the ringing signal occurs, provides for the beginning of a new timing cycle, through elements 47 and 48, at the end of the ringing signal. This process is repeated for every ringing signal until the cam rise 31*a* closes the switch 50, after a preselected number of ringing signals have been received. However, this closing of the switch 50, does not, as yet, cause the relay 49 to become energized.

This is due to the condition that the switch 43 actuated by the solenoid 40 is in the open state because the solenoid is energized.

If, now, no further ringing signals are received, the solenoid 40 is released after a time interval which is longer than the period of time prevailing between two ringing signals, and shorter than the time that may elapse between two successive calling signals. With the release of solenoid 40, in this manner, the switch 43 is closed and the relay 49 is energized.

If a ringing signal is received in addition to the required and predetermined quantity, the cam rise 31*a* releases the switch 50 and, accordingly, the relay 49 cannot become energized. If, under these circumstances, the ringing signals finally cease, the solenoid 40 is released after a specific time interval and the links 35 and 36 are, thereby, spread apart. As a result, the ratchet wheel 29 as well as cam 31 are returned, under the action of spring 32, to their initial or normal positions. The cam rise 31*a* is designed, in this connection, so that it does not close the switch 50 during the return motion of the cam.

If the ringing signals cease before the cam rise 31*a* has reached the switch 50, the ratchet wheel 29 is similarly returned to its initial position, upon the release of solenoid 40. The proper person placing the call, can therefore, count the number of ringing signals as they occur, and interrupt any further transmission of them as soon as the correct number of signals has been attained. Since the circuitry will not become actuated when the number of ringing signals transmitted is greater than that required, the possibility that an unsuspecting caller will trigger the circuitry is thereby, considerably diminished.

To reduce uncertainties and errors associated with the counting of the ringing signals, the cam rise 31*a* may be increased in length so that the switch 50 remains closed over a larger portion of the angular movement of the ratchet wheel. A further advantage of this device for summing the ringing signals, resides in the condition that the apparatus remains normally in operative condition, even when a circuit is connected thereto. It is only necessary that an incoming call be received before the critical number of ringing signals has been attained.

FIGS. 5 to 8 shown an arrangement whereby the controlling signal is derived from an acoustical apparatus which is portable and may be readily carried by the calling person initiating the controlling function. The acoustical apparatus is coded corresponding to a predetermined code associated with the telephone apparatus receiving the controlling instructions.

Figure 5:
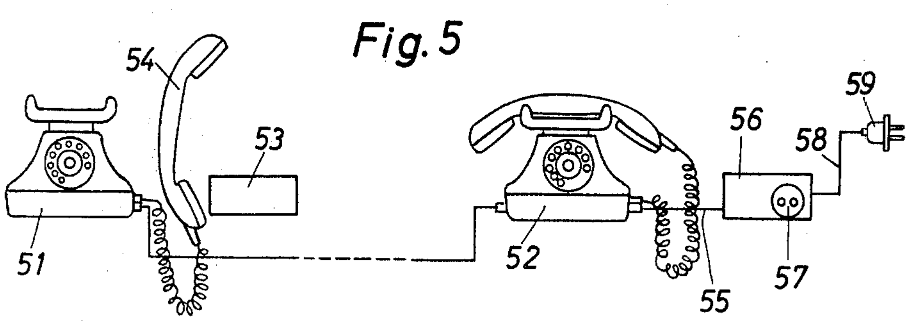
FIG. 5 is a functional schematic diagram of an acoustical keying arrangement.

FIG. 5 illustrates a conventional telephone apparatus 51, connected to a similar unit 52 which receives the controlling instructions from the calling person using the apparatus 51. After the calling person has dialed the proper number associated with the receiving apparatus 52, he places the unit 53, containing the acoustical code, next to the mouthpiece of the receiver 54. The telephone apparatus 52 is connected, by way of the path 55, to an acoustical lock contained within the unit 56. The latter is provided with a connector 57 to which a circuit may be connected and actuated. The circuitry within the unit 56 itself, is energized by being connected to an electrical source by way of the cable 58 and connector or plug 59.

Figure 6:
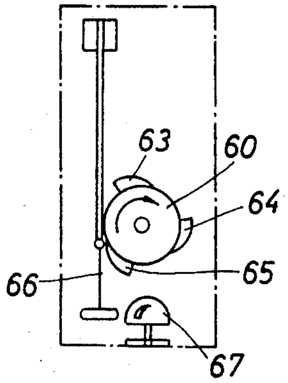
FIG. 6 is an elevational view of an acoustical keying arrangement associated with the configuration of FIG. 5.
Figure 7:
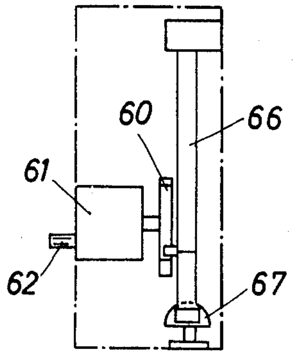
FIG. 7 is a side view of the arrangement of FIG. 6.

FIGS. 6 and 7 illustrate the manner in which an acoustical keying unit may be constructed. A cam 60 is mounted on a shaft of a spring-driven stopping device 61. The spring mechanism associated with the device 61 corresponds to that conventionally used in automatic photography release mechanism or toy watches. The stopping device, on the other hand, is similar to the Geneva stop found in cameras and watch mechanisms. The purpose of this stopping device is to provide a timing function. The spring mechanism 61 applies a substantially constant angular velocity to the cam 60, for at least 1 revolution. This action is achieved after the spring mechanism has been wound by pressing or actuating pin 62. The cam 60 is provided with three humps 63, 64 and 65 which actuate a spring-suspended hammer 66. When in a freely movable state, the hammer may strike against a bell 67 or the housing of the apparatus itself.

Figure 8:
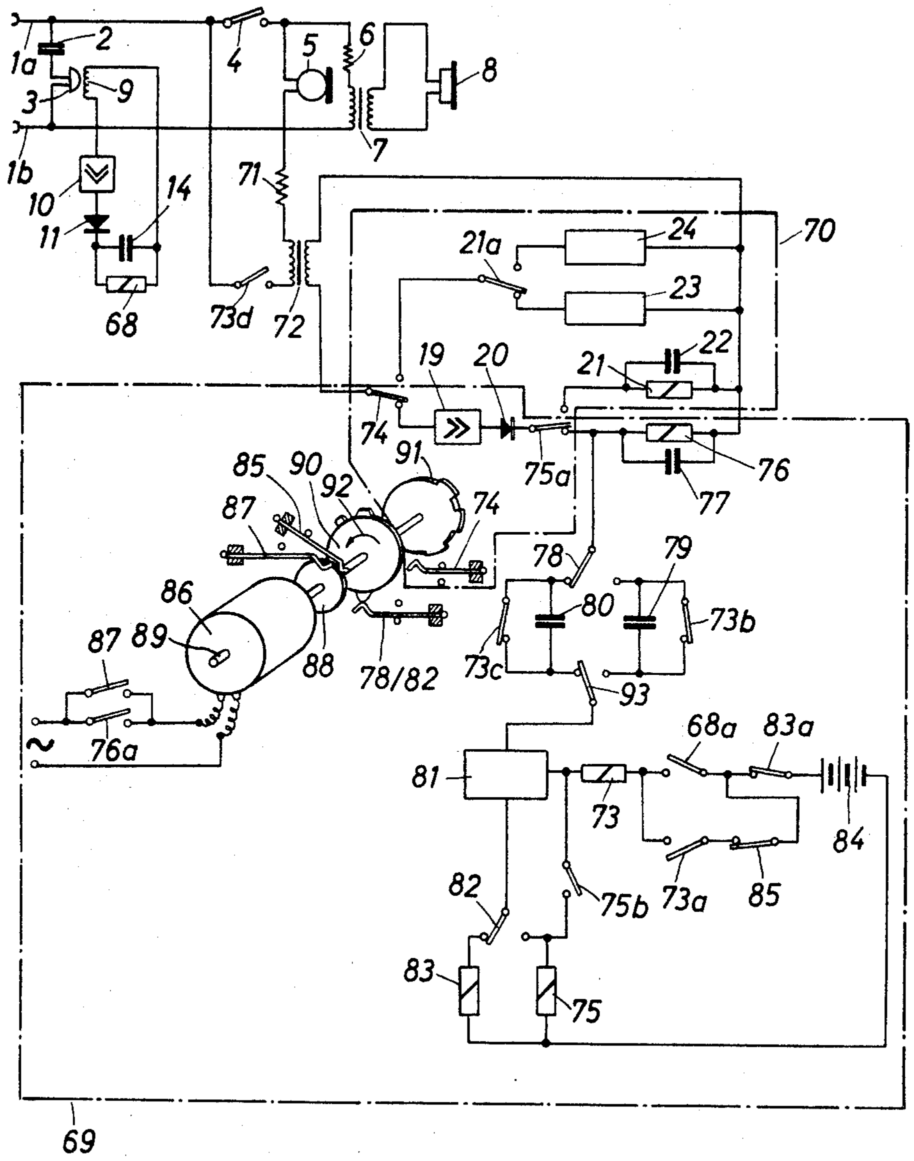
FIG. 8 is a functional schematic and electrical circuit diagram of the arrangement of FIG. 5.

The principle upon which the acoustical lock is based, may be obtained from FIG. 8. The elements having reference numerals 1—11 inclusive and 14, are identical to those illustrated in FIG. 1, and function also in the same manner. The capacitance of the condenser 14 may be maintained relatively small if the circuit through the main telephone communication line is to be completed after the first ringing signal. The relay 68 serves, in this embodiment, only as a starting device for the circuitry contained within the outlined unit 69. The circuitry confined within the outlined unit 70, corresponds to a control transmission and indicating unit as illustrated in FIG. 2.

Connected in parallel with the switch 4, is the series circuit including the mouthpiece or microphone 5, a resistor 71, the primary winding of a transformer 72, and a switching contact 73*d*. The secondary winding of the transformer 72 includes a switch 74 which has a contact leading to an amplifier 19 and rectifier 20. The latter two elements are identical in construction and operation to those described in relation to FIG. 2. The rectifier 20 leads to a switching contact 75*a*, actuated by the relay coil 75, and from there to a starting relay coil 76 which is connected in parallel with a capacitor 77. The terminal end of the relay coil 76 is, in turn, connected to the other end of the secondary winding of the transformer 72, and thus completes the circuit.

The junction connecting the switching contact 75*a* and capacitor 77, is further connected to a switch 78 actuated in a manner to be described. Both contacts of the switch 78 lead to the storage capacitor 79 and 80, connected in parallel with normally closed switches 73*b*, and 73*c*, respectively. A switch 93 having contacts connected to the capacitor 79 and 80, in a manner similar to that of switch 78, leads to a conventional switching circuit 81. The latter, comprised preferably of two transistors, energizes either the operative relay 75 or the error relay 83, depending upon the position of the switch 82. Relay coils 75 and 83 are energized, through the switching circuit 81, as a function of the potential on the capacitor 79 or 80. The switching circuit 81, is furthermore, connected to a direct current power source 84 by way of the path including a switching contact 83*a*, switching contact 68*a*, and relay coil 73. The switching contacts 83*a* and 68*a* are actuated by the relay coils 83 and 68, respectively. Although the direct current power supply 84 is illustrated, for exemplary purposes, as a battery, it may be derived by connecting directly to a main AC power supply station.

Connected in parallel with the switching contact 68*a*, is the series circuit including the normally closed switch 85 and the switching contact 73*a*, actuated by the relay coil 73. A switching contact 75*b* serves to connect the relay coil 75 to the direct current derived from the power source 84.

An electric motor 86 is connected to an alternating current power supply by way of the switching contacts 76*a*, connected in parallel with a switch 87. The switching contacts 76*a* is actuated by the relay coil 76. Coupled to the motor 86, is a speed-reducing mechanism (not shown separately from the motor) which has a shaft 89 that rotates approximately 1 revolution per minute. The speed-reducing mechanism may be comprised, in a conventional manner, of a plurality of gears enclosed within the housing of the motor itself. A cam 88 is mounted upon the shaft 89 and opens the switch 87 only when it is located at its designated null or initial position. A cam 90 also mounted upon the shaft 89, actuates the switches 78, 82 and 93 in a timing sequence corresponding to the acoustical code. The switching humps of the cam 19 occupy thereby approximately one-half of the cam's circumference.

During the other half of the preceding cam's rotation, a further cam 91 actuates a switch 74 which is normally closed.

The rotational direction of the shaft 89 and hence cams 88, 90 and 91, is shown by the direction of the arrow 92 drawn upon the cam 90. The cam 88 actuates, furthermore, a switch 85, in a manner, so that it is opened, and closed again over a brief period, just before the cam reaches the null or initial position, corresponding to a cam rotation which is somewhat less than a full revolution.

The flip-flop relay 21 is connected between the switching contact 75*a*, and the secondary winding of the transformer 72. The capacitor 22 is connected in parallel with the coil of this relay 21. The switching contact 21*a* leads to a contact of the switch 74 and to the AC signal generators 23 and 24. With one of these generators emitting a high-pitched tone while the other is designed to emit a low-pitched tone, it is possible to differentiate, across the main telephone transmission line, the switching state of the flip-flop relay 21 which actuates the switching contact 21*a*. The circuitry shown in FIG. 8 operates in the following manner:

After the proper or authorized calling person has dialed the number associated with the telephone apparatus shown in FIG. 8, ringing signals appears which cause the energizing of relay 68, sooner, or later depending upon the size of the capacitor 14. With the energizing of the coil 68, the switching contact 68*a* is closed and the relay 73 is thereby energized. In order that the relay 73 remains energized when the relay coil 68 becomes deenergized, the switching contacts 73*a* is closed. Aside from this, the operation or energizing of the relay 73 causes the two switching contacts 73*b* and 73*c* to become opened. In this manner, the signal along the main communication line 1*a*—1*b* can pass to the storage capacitors 79 or 80, by way of the transformer 72 and the switching contact 73*d* which is closed when the relay coil 73 is energized. The first significant sound along the main communication line causes the relay 76 to become energized, and the motor 86 to commence driving thereby. The relay 76 serves a synchronizing function whereby the circuitry contained within the outlined unit 69, becomes initiated with the first sound emitted by the bell 67 in FIG. 6. Once the motor 86 is operating, the relay 76 functions as a voltage divider. If the resulting drop in current leading to capacitors 79 and 80 is undesirable, an additional switching contact may be inserted within the circuit of switching contact 75*a*, relay coil 76, and switch 78. This additional switching contact would be operated by the relay coil 75. The relay 76 and its associated circuitry can be omitted, in the case when the calling party actuates immediately, after the energizing of the relay 68, the pin 62 of the spring mechanism associated with the acoustical keying arrangement. The operation of the motor 86 would then be inhibited by the action of relay 73.

The switches 78 and 82 are operated and controlled by the cam 90 so that signals appearing along the main communication line 1*a*—1*b* are lead to the capacitor 79, during the period of time that the associated acoustical keying signals are expected. Between such times, the capacitor 80 is switched into the circuit and serves as the storage element for such signals. The charged state of the capacitors 79 and 80 is continuously checked by the switching and sampling circuit 81. As soon as one of these two capacitors has attained the critical potential, the relay coil 75 or 83 is energized, depending upon the position of the switch 82. The capacitor 80, moreover, will inhibit the energizing of the operative relay 75, when a steady signal appears along the main telephone communication line.

The capacitance values of the preceding condensers are selected so that the error relay 83 becomes in this case, energized first. With the energizing of the relay 83, the relay 73 is, on the other hand, released due to the opening of the switching contact 83*a*. The direct current power supply 84 is, in this manner, disconnected immediately from the circuit. The motor 86 continues to operate, however, until, after approximately 1- minute maximum, cam 88 has returned to its initial or normal starting position. If the capacitor 79 causes the relay 75 to become energized first, the latter is retained in the energized state as a result of the closing of the switching contact 75*b*, which assures that the coil 75 is provided with continued power supply. Aside from this, the energizing of the relay 75 causes the actuation of the switching contact 75*a*, which connects the flip-flop relay 21 with the rectifier 20.

Under these circumstances, the calling party has opened the acoustical lock, and can determine, thereby, the switching state of the relay 21, as described in association with FIG. 2. If he so desires, he may change this switching state during the period of time derived from the switch 74. Shortly before the cam 88 completes a full revolution, the latter opens the switch 85, whereby the relays 73 and 75 are released. The switching contacts associated with these relays 73 and 75 are, thereby, all returned to their initial or normal positions. The motor 86 ceases to rotate after the completion of a completed revolution.

If, during the rotational period of the cam 88, insufficient audio signals are transmitted to energize one of the relays 75 and 83, the relay 73 is released. This latter condition is achieved through the cam 85 which opens the switch 85 shortly before it terminates a revolution. As a result, the direct current power supply is disconnected from the circuit, and the motor returns to its initial or starting position. All other elements are, accordingly, also returned to their initial or normal positions corresponding to those shown in the drawing.

While the invention has been illustrated and described as embodied in control circuits actuated by conventional telephone apparatus, it is not intended to be limited to the details shown, since various modifications and structural changes may be made without departing in any way from the spirit of the present invention.

We claim:

1. An arrangement for controlling electrical equipment comprising, in combination, a receiving and transmitting telephone apparatus; a telephone communication line connected to said receiving and transmitting apparatus for transmitting all signals to said apparatus and being an audio communication link between said apparatus and a location remote from said apparatus; call signal sensing means at said apparatus for sensing when a call signal is received by said apparatus; capacitor storage means connected to said sensing means and being charged with a predetermined quantity of charge for every call signal received by said apparatus; responding means connected to said capacitor storage means and being actuated when a predetermined arrangement of call signals has been received, said responding means providing upon being actuated a signal for controlling said electrical equipment; a plurality of audio signal generators for applying to said telephone communication line audio signals indicating the operating state of said electrical equipment; and switching means for routing an audio signal from one of said audio generators to said telephone communication line for a predetermined time interval, and switching to another audio generator upon an instruction signal received from said telephone communication line after said predetermined time interval.

2. An arrangement for controlling electrical equipment as defined in claim 1 including a motor driven cam in said switching means for determining said time interval and operating said switching means.